United States Patent [19]

Wright

[11] Patent Number: 4,978,591

[45] Date of Patent: Dec. 18, 1990

[54] CORROSION FREE PHOSPHORIC ACID FUEL CELL

[75] Inventor: Maynard K. Wright, Bethel Park, Pa.

[73] Assignee: The United States of America as represented by the United States Department of Energy, Washington, D.C.

[21] Appl. No.: 405,718

[22] Filed: Sep. 11, 1989

[51] Int. Cl.$^5$ .............................................. H01M 2/08
[52] U.S. Cl. ........................................ 429/35; 429/36; 429/46
[58] Field of Search .................................. 429/34–39, 429/185, 46, 72

[56] References Cited

U.S. PATENT DOCUMENTS

| 4,383,008 | 5/1983 | Chi | 429/38 |
| 4,463,066 | 7/1984 | Adlhart et al. | 429/34 |

FOREIGN PATENT DOCUMENTS 59-75568A 4/1984 Japan .
59-91671A 5/1984 Japan .

Primary Examiner—Anthony Skapars
Attorney, Agent, or Firm—Fred J. Baehr, Jr.

[57] ABSTRACT

A phosphoric acid fuel cell with an electrolyte fuel system which supplies electrolyte via a wick disposed adjacent a cathode to an absorbent matrix which transports the electrolyte to portions of the cathode and an anode which overlaps the cathode on all sides to prevent corrosion within the cell.

5 Claims, 1 Drawing Sheet

– 4,978,591 –

CORROSION FREE PHOSPHORIC ACID FUEL CELL

GOVERNMENT CONTRACT

This invention was conceived or first reduced to practice in the course of, or under contract number DEAC21-82MC24223 between Westinghouse Electric Corporation and the United Stated Government, represented by the Department of Energy.

CROSS REFERENCE TO RELATED APPLICATIONS

This application is related to co-pending applications entitled Dry Compliant Seal For Phosphoric Acid Fuel Cell, Ser. No. 405,716, and Integral Edge Seals For Phosphoric Acid Fuel Cells, Ser. No. 405,717, filed concurrently herewith.

BACKGROUND OF THE INVENTION

The invention relates to a phosphoric acid fuel cell and more particularly to a phosphoric acid fuel cell with a replenishment electrolyte feed to a cell matrix from the cathode side where the cathode is smaller than the anode to prevent corrosion of the cathode side of the fuel cell.

When operating, phosphoric acid fuel cells experience electrolyte losses due to volume changes caused by changes in operating parameters, absorption by plates, and normal evaporation. The cells incorporate an electrolyte replenishment feed to each cell to accommodate these changes and allow continuous operation of the cells over extended periods of time. The electrolyte feed system, herebefore used, has resulted in corrosion damage of the cathode and its interface with the bipolar plate where they overlap the anode, because it is necessary expose the matrix to the electrolyte in the acid grooves in the margins of the long sides of the fuel cell to maintain adequate electrolyte in the fuel cells. The acid supply grooves of such systems were put in the anode side of the bipolar plates so that the acid supply would wick directly into the matrix at the center of the cell and not through the back of the cell.

SUMMARY OF THE INVENTION

Among the objects of the invention may be noted the provision of a cell arrangement, which has a electrolyte replenishment feed system and does not experience corrosion of the cathode and adjacent bipolar plate.

In general, a phosphoric acid fuel cell, when made in accordance with this invention, comprises an anode assembly with a catalytic anode layer, a cathode assembly with a catalytic cathode layer, and a matrix disposed therebetween forming the cell elements, which are disposed between a pair of bipolar plates that have a plurality of grooves for supplying fuel gas to the anode assembly and an oxidant to the cathode assembly. The catalytic anode layer is larger than the catalytic cathode layer and the portion of the bipolar plate adjacent the cathode assembly has electrolyte grooves disposed therein with a wick disposed in each electrolyte groove to supply electrolyte to the matrix, which transports electrolyte to catalytic the layer of the anode and cathode assemblies.

BRIEF DESCRIPTION OF THE DRAWINGS

The invention as set forth in the claims will become more apparent by reading the following detailed description in conjunction with the accompanying drawings, wherein like reference numerals refer to like parts through the drawings and in which:

DESCRIPTION OF THE PREFERRED EMBODIMENT

Figure 1:
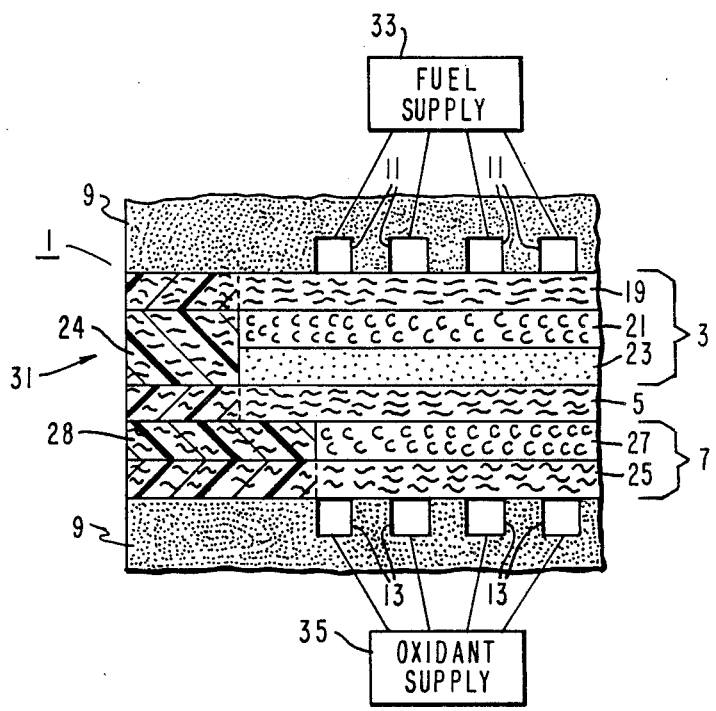
FIG. 1 is a partial sectional view of a fuel cell taken along one edge thereof.
Figure 2:
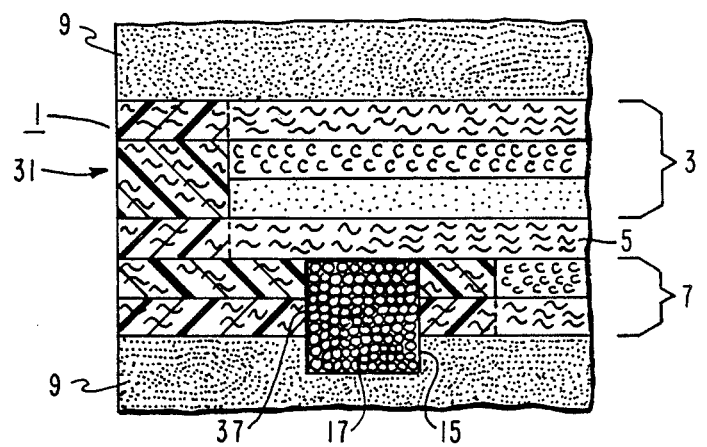
FIG. 2 is a partial sectional view of the fuel cell taken along an adjacent edge.

Referring now to the drawings in detail and in particular to FIG. 1 and 2, there is shown a portion of a fuel cell 1 comprising an anode assembly 3, a matrix 5 and a cathode assembly 7 disposed between a pair of conductive bipolar plates 9. The bipolar plates 9 have a plurality of grooves 11 and 13, for, respectively, supplying fuel gas, hydrogen, to the anode assembly 3 and oxygen form the air to the cathode assembly 7. The bipolar plates 9 also have electrolyte or phosphoric acid grooves 15 with a wick 17 disposed in each groove 15 for supplying electrolyte to the matrix 5, which transports the electrolyte to portions of the anode and cathode assemblies 3 and 7.

The anode and cathode assemblies 3 and 7 and matrix 5 are generally made up of one or more rectangular shaped sheets or layers, laying on top of each other and have one pair of sides longer than the other pair, of course it is understood that they could be any shape.

The anode assembly 3 is made up of a sheet or layer of backing paper 19 treated with a Teflon material to make it wet proof or hydrophobic so that the electrolyte will not penetrate it, but fuel gas will easily pass therethrough and a layer of catalytic material 21 overlaying the backing paper 19. The layer of catalytic material 21 is absorbent or hydrophilic and is smaller than the backing paper 19. A layer of silicon carbide 23 is disposed over the catalytic layers 21 to act as an electron insulator and prevent the flow of electrons between the anode and cathode assemblies 3 and 7 within the fuel cell 1. The silicon carbide layer is also absorbent or hydrophilic so that electrolyte will flow therethrough. The silicon carbide is an insulator and not conductive and the electrical resistance of the electrolyte contained therein is sufficiently high so that at the voltages produced by the cell's electrons will not conduct therethrough. A band of filler paper 24 is disposed contiguous with the outer periphery of the catalytic and silicon carbide layer 21 and 23 and the outer perimeter of the filler paper 24, registers with the outer periphery of the backing paper 19 and is bonded thereto.

The cathode assembly 7 is made up of a layer of backing paper 25 treated with teflon or other liquid repelling material to make it wet proof or hydrophobic so that he electrolyte will not penetrate it, but air containing oxygen will easily pass therethrough and a layer of catalytic material 27 overlaying the backing paper 25. The catalytic layer 27 is smaller than the backing paper 25. A band of filler paper 28 is disposed contiguous with the outer periphery of the catalytic layer 27, registers with the outer periphery of the backing paper 25 and is bonded thereto.

The matrix 5 is made of an absorbent material or one that is hydrophilic and serves to transport the electrolyte to the catalytic layer 21 and 27 of the anode and cathode assemblies 3 and 7. The matrix 5 is larger than the catalytic layer 27 of the cathode assembly 7 and overlaps the wicks 17 disposed on opposite sides thereof allowing the electrolyte to flow from the wicks 17, through the matrix 5 and the silicon carbide layer 23 and into the cathodic layers 21 and 27 of the anode and cathode assemblies 3 and 7.

Integral edge seals, generally indicated at 31, are formed by a band of elastomer impregnated material disposed contiguous with or adjacent the peripheral edges of the fuel cell elements. The bands are made by impregnating the edges of the backing paper 19 and 25 with an elastomer such as Aflas, a copolymer of tetrafluoroethylene and propylene, and by impregnating filler paper 24 and 28 with elastomer and bonding the impregnated filler paper 24 and 28 to the impregnated band of the backing paper 19 and 25, respectively, to form the integral edge seals 31, shown in FIGS. 1 and 2. The sealing bands can also be made of individual seal strips, which form a frame encircling the elements of the fuel cell 1 and would be generally the same width as the bands shown in FIGS. 1 and 2. The seal bands cooperate with the matrix to enclose the anode and cathode and prevent air intrusion into the anode and thereby inhibit corrosion of the cathode and the adjacent conductive plate 9. A fuel gas supply 33, which provides fuel gas to the anode via the grooves 11, is adapted to supply fuel gas at a slightly higher pressure than the oxidant supplied to the cathode via the grooves 13 by an oxidant supply 35, in order to enhance the exclusion of air from the anode and inhibit the corrosion of the cathode and the adjacent conductive plate 9.

As shown in FIG. 2, the bands forming the integral edge seals 31 adjacent the short side of the fuel cell 1 and contiguous with the catalytic layer 27 of the cathode assembly 7 is wider than the bands in the matrix 5 and the anode assembly 3 forming a wet seal between the anode and cathode. The bands forming the integral edge seals 31 adjacent the long sides of the fuel cell 1 and contiguous with the catalytic layer 27 of the cathode assembly 7 is substantially wider than the other seal bands and have openings 37 which register with the grooves 15 to receive the wicks 17 and feed electrolyte to the matrix 5, which transfers the electrolyte to the catalytic layers 21 and 27 of the anode and cathode assemblies 3 and 7 and serves as a wet seal between the cathode and anode preventing hydrogen and oxygen gases from coming in contact with one another. Providing the electrolyte grooves 15 and wicks 17 adjacent the cathode is also advantageous as there is always some air which enters along with the electrolyte. Since the cathode is supplied with air, the air leakage via the electrolyte grooves 15 has no effect on the cathode. However, if the electrolyte grooves 15 were disposed adjacent the anode the air entering with the electrolyte would depolarize the anode in the air rich region and set up a corrosion cell causing cathode side corrosion. Having the anode assembly 3 and matrix 5 overlap the wick area, not only allows the matrix 5 and silicon carbide layer 23 of the anode assembly 3 to form a wet seal between the anode and cathode, but it also allows hydrogen to permeate to the edges of the catalyst layer 21 of the anode assembly 3, so that if any oxygen does leak through the edges of the matrix 5 there is sufficient hydrogen available to react therewith and thus preventing any corrosion of the cathode 7 and the adjacent bipolar plate 9.

While the preferred embodiments described herein set forth the best mode to practice this invention, presently contemplated by the inventor, numerous modifications and adaptations of this invention will be apparent to others skilled in the art. Therefore, the embodiments are to be considered as illustrative and exemplary and it is understood that numerous modifications and adaptations of the invention as described in the claims will be apparent to those skilled in the art. Thus, the claims are intended to cover such modifications and adaptations as they are considered to be within the spirit and scope of this invention.

What is claimed is:

1. A phosphoric acid fuel cell comprising an anode assembly with a catalytic anode layer, a cathode assembly with a catalytic cathode layer, and a matrix disposed therebetween forming the cell elements, which are disposed between a pair of conductive plates that have a plurality of grooves for supplying fuel gas to the anode assembly and an oxidant to the cathode assembly, the catalytic anode layer being larger than the catalytic cathode layer and the portion of the conductive plate adjacent the cathode assembly having electrolyte grooves disposed therein with a wick disposed in each electrolyte groove to supply electrolyte to the matrix, which transports electrolyte to catalytic layer of the anode and cathode assemblies, the size of the catalytic layers and the disposition of the electrolyte grooves cooperating to eliminate corrosion of the cathode layers and the adjacent conductive plate.

2. A fuel cell as set forth in claim 1, wherein the anode assembly cathode assembly and matrix assemblies each have a sealing band contiguous with its outer periphery, the width of the sealing band of the cathode assembly being wider than the width of the sealing band of the anode assembly and the matrix, and the sealing band contiguous with the outer periphery of the cathode assembly having a plurality of slotted openings, which register with the electrolyte grooves in the conductive plate adjacent the cathode and have the wicks disposed therein to supply electrolyte to the matrix.

3. A fuel cell as set forth in claim 2, wherein the fuel cells are rectangular with one pair of sides longer than the other and the width of the sealing bands contiguous with the longer sides of the cathode assembly is wider than the width of the short side bands and the long side bands have the openings which register with the electrolyte grooves in the conductive plate adjacent the cathode.

4. A fuel cell as set forth in claim 1, comprising a fuel gas supply for the anode and an oxidant supply for the cathode, the fuel gas supply being adapted to operate at a higher pressure than the oxidant supply in order to enhance the exclusion of air from the anode and thereby inhibit corrosion of the cathode and the adjacent conductive plate.

5. A fuel cell as set forth in claim 1, wherein the seal bands cooperate with the matrix to enclose the anode and prevent air intrusion into the anode and thereby inhibit corrosion of the cathode and the adjacent conductive plate.

* * * * *